United States Patent
Hastings et al.

(10) Patent No.: US 6,244,100 B1
(45) Date of Patent: Jun. 12, 2001

(54) TEMPERATURE COMPENSATION FOR AUTOMATED LEAK DETECTION

(75) Inventors: Calvin R. Hastings; Donald R. Augenstein, both of Pittsburgh, PA (US); Herbert Estrada, Annapolis, MD (US)

(73) Assignee: Caldon, Inc., Pittsburgh, PA (US)

( * ) Notice: Subject to any disclaimer, the term of this patent is extended or adjusted under 35 U.S.C. 154(b) by 0 days.

(21) Appl. No.: 09/241,364

(22) Filed: Jan. 29, 1999

(51) Int. Cl.[7] .................................................. G01M 3/08
(52) U.S. Cl. ......................................... 73/49.1; 73/40.5 A
(58) Field of Search ............................. 73/40.5 R, 40.5 A, 73/49.1, 592, 49.2

(56) References Cited

U.S. PATENT DOCUMENTS

| | | |
|---|---|---|
| 4,608,857 * | 9/1986 | Mertens et al. .................... 73/40.5 R |
| 4,646,560 | 3/1987 | Maresca, Jr. et al. . |
| 4,709,577 | 12/1987 | Thompson . |
| 4,725,551 | 2/1988 | Thompson . |
| 4,796,466 | 1/1989 | Farmer . |
| 5,046,353 | 9/1991 | Thompson . |
| 5,048,324 | 9/1991 | Thompson . |
| 5,076,728 | 12/1991 | Golding . |
| 5,078,006 | 1/1992 | Maresca, Jr. et al. . |
| 5,090,234 | 2/1992 | Maresca, Jr. et al. . |
| 5,127,266 | 7/1992 | Maresca et al. . |
| 5,163,314 | 11/1992 | Maresca, Jr. et al. . |
| 5,170,657 * | 12/1992 | Maresca, Jr. et al. ............ 73/40.5 R |
| 5,189,904 | 3/1993 | Maresca, Jr. et al. . |
| 5,272,646 | 12/1993 | Farmer . |
| 5,315,529 | 5/1994 | Farmer . |
| 5,375,455 | 12/1994 | Maresca, Jr. et al. . |
| 5,415,033 | 5/1995 | Maresca, Jr. et al. . |
| 5,447,055 | 9/1995 | Thompson et al. . |
| 5,948,969 | 9/1999 | Fierro et al. . |

* cited by examiner

Primary Examiner—Hezron Williams
Assistant Examiner—Jay L Politzer
(74) Attorney, Agent, or Firm—Ansel M. Schwartz

(57) ABSTRACT

An apparatus for detecting a leak in an isolated segment of a pipe with a known fluid: The apparatus includes a mechanism for producing a pressure pulse in the pipe. The producing mechanism is adapted for connection to the pipe. The apparatus includes a mechanism for sensing the reflection of the pulse in the pipe and a pressure sensor for sensing the pressure in the pipe. The pressure sensor is adapted for connection to the pipe. The apparatus includes a mechanism for determining whether the pressure of the fluid in the pipe has negatively deviated from an expected pressure-temperature relationship of the fluid in the pipe. A method for detecting a fluid leak in an isolated segment of a pipe: The method consists of five steps: Step 1, measure the average propagation velocity of the fluid in an isolated segment of the pipeline at time $t_1$. Step 2, measure the pressure of the fluid in the isolated segment of the pipe at time $t_1$. Step 3, measure the pressure of the fluid in the isolated segment of the pipe at time $t_2$ and calculate the change in pressure occurring between $t_2$ and $t_1$. Step 4, measure the average propagation velocity of the fluid in an isolated segment of the pipe at time $t_2$ and determine the corresponding change in average temperature. Step 5, calculate the amount of pressure change due to temperature changes and the amount due to probable leaks.

9 Claims, 3 Drawing Sheets

TEMPERATURE COMPENSATION FOR AUTOMATED LEAK DETECTION

FIELD OF THE INVENTION

The present invention is related to leak detection in pipe based on deviation of pressure from an expected pressure-temperature relationship of the fluid in the pipe.

BACKGROUND OF THE INVENTION

To protect the environment, regulations are being enacted to ensure that leaks of hazardous materials from underground pipelines are detected in a timely way to limit spill sizes. One such procedure is the Environmental Protection Agency procedure, "EPA—Standard Test Procedures for Evaluating Leak Detection Methods: Pipeline Leak Detection Systems". This procedure requires that leaks as small as 3 gph at a 10-psi line pressure must be detected.

In some cases, the only practical method of leak detection is to pressurize the pipeline under static conditions (that is, with valves closed at each end, thereby preventing flow through the pipeline) and then monitor the line pressure for a suitable period to detect a leak. This approach may be referred to as the "pressure decay" method. Given the accurate pressure sensors available today, it is possible to detect leaks as small as 3 gph at 10 psi by monitoring the decay of pressure caused by the leak. The pressure decay method requires that the pipeline temperature be held constant or that changes in temperature over the length of the pipeline be accounted for. Temperature stability or compensation is required since a slight decrease in temperature can also cause pressure decay, a pressure decay which can be mistaken for a leak.

Because maintaining temperature stability is difficult in some situations, the pressure decay method is limited in its use. In many instances, the time required for temperature to equilibrate or stabilize is so long that it imposes unacceptably long downtimes on an operational pipeline. In others instances, sufficient temperature equilibrium may not be attainable.

Compensating for the effects of temperature on buried pipelines can also be too complex or expensive to be practical. Rarely has an array of suitable temperature sensors been installed at the time of pipeline construction.

SUMMARY OF THE INVENTION

The present invention pertains to an apparatus for compensating for changes in fluid temperature to be used in detecting a leak in an isolated segment of a pipe with a known fluid and does so uniquely by compensating for temperature effects on pressure without requiring any direct measurement of temperature.

The apparatus comprises a mechanism for producing pressure pulses in the pipe in order to measure changes in the average propagation velocity of the fluid in the pipeline. The producing mechanism is adapted for connection to the pipe. The apparatus comprises a pressure sensor for sensing the reflection of the pulse in the pipe. The pressure sensor is adapted for connection to the pipe. The apparatus comprises a mechanism for determining whether the pressure of the fluid in the pipe has negatively deviated from that expected from the pressure-temperature relationship of the fluid in the pipe.

The present invention is based on a method for detecting a fluid leak in an isolated segment of a pipe. The method comprises five steps: Step 1, Measure propagation velocity by measuring pressure pulse transit time in an isolated pipe at time $t_1$: Step 2, measure the pressure of the fluid in the isolated segment of the pipe at time $t_1$. Step 3, measure the pressure of the fluid in the isolated segment of the pipe at time $t_2$ and calculate the change in pressure occurring between $t_2$ and $t_1$. Step 4, measure the propagation velocity by measuring pressure pulse transit time in the isolated segment of the pipe at time $t_2$ and determine the corresponding change in propagation velocity and from it determine the change in average temperature. Step 5, calculate the amount of pressure change due to temperature changes and the amount due to probable leaks.

The physical principle used is the relationship between fluid propagation velocity and temperature. (Propagation velocity is the speed at which pressure disturbances move in the fluid in the pipeline.) Consequently, if changes in the propagation velocity are measured, a change in temperature can be determined. Moreover, if the change in propagation velocity over the length of the pipeline can be measured, the effective change in the average temperature over the entire pipeline can be accounted for.

BRIEF DESCRIPTION OF THE DRAWINGS

The accompanying drawings illustrate the components of the invention and the methods of practicing the invention.

DETAILED DESCRIPTION

Figure 2:
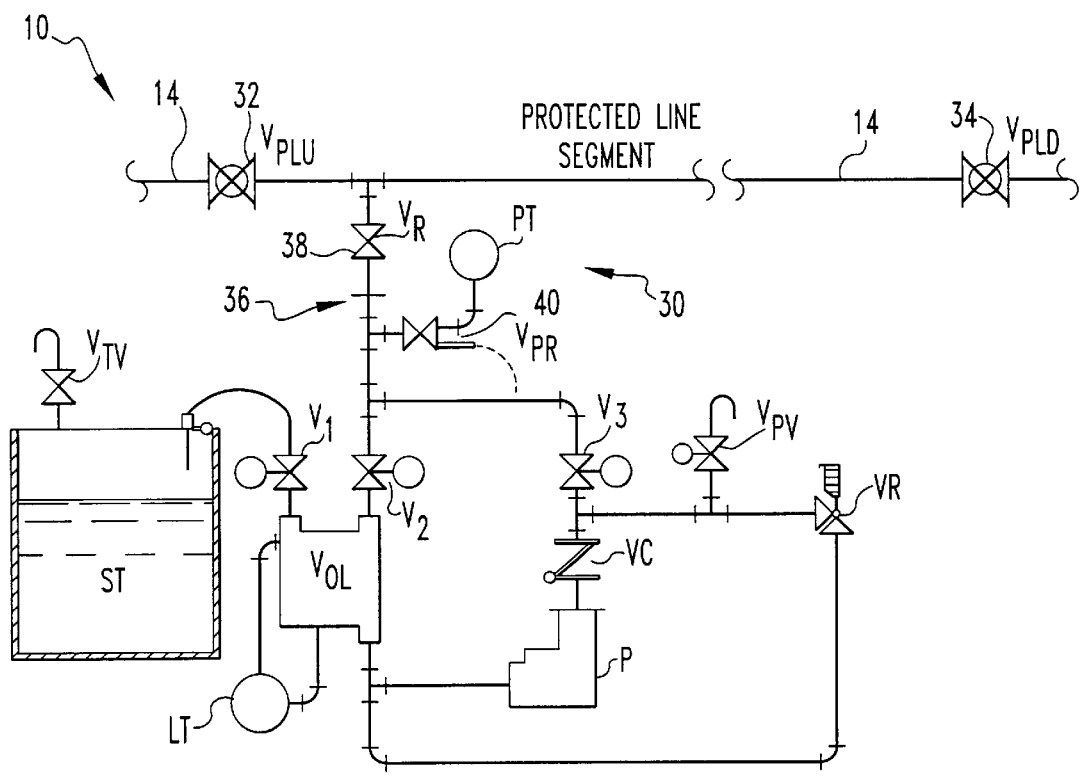
FIG. 2 is a schematic representation of the apparatus of the present invention.
Figure 3:
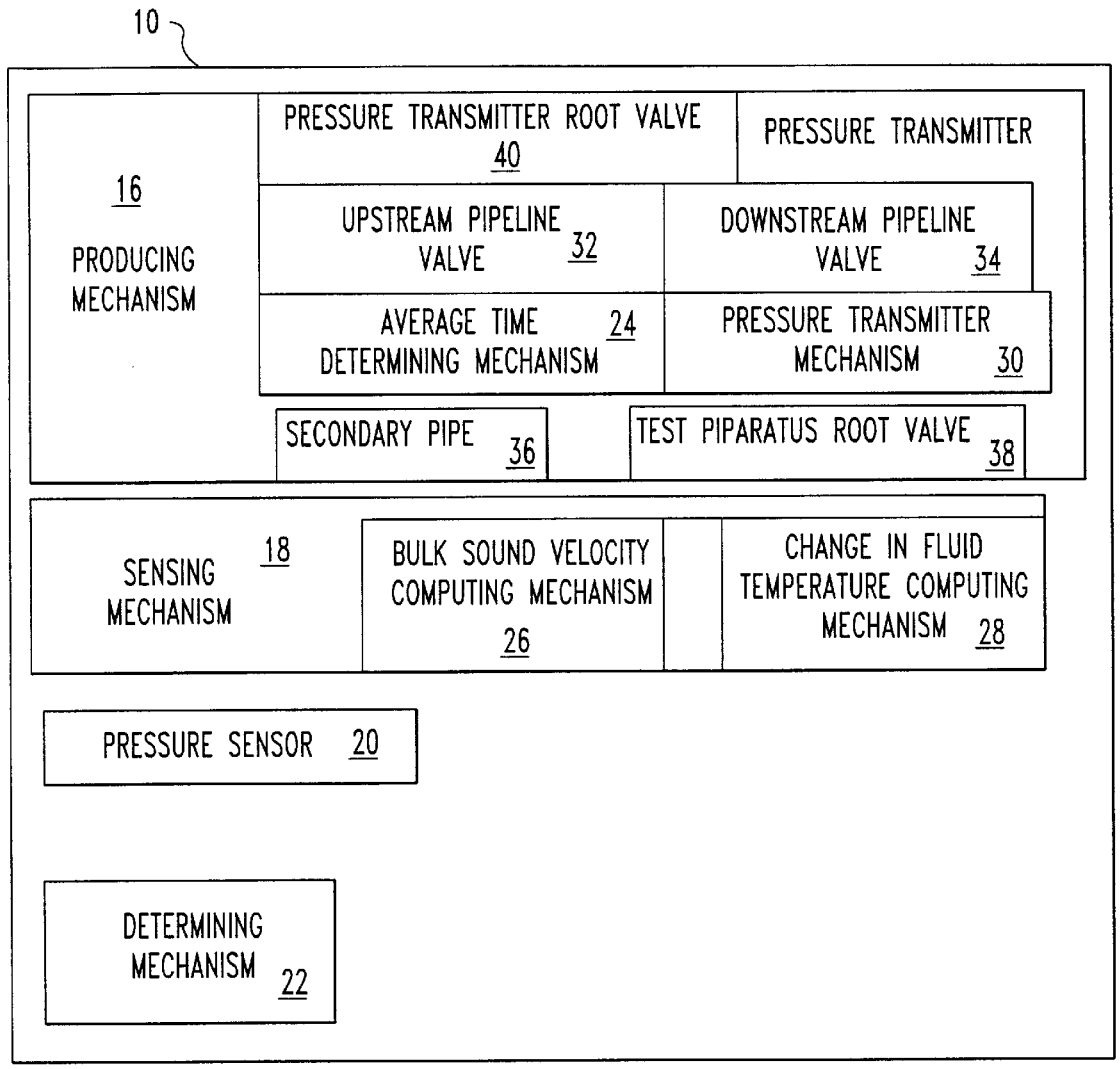
FIG. 3 is a schematic representation of an alternative embodiment of the present invention.
Figure 4:
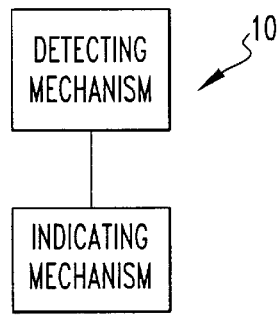
FIG. 4 is a schematic representation of the apparatus

Reference numerals in the drawings refer to similar or identical parts throughout the several views. FIGS. 2 and 4 show an apparatus 10 for detecting a leak in an isolated (protected) segment 12 of a pipe 14 with a known fluid. Apparatus 10 comprises a mechanism 16 for producing a pressure pulse. The producing mechanism 16 is connected to the pipe. Apparatus 10 also comprises a mechanism 18 for sensing the reflection of the pressure pulse in the pipe. In addition, apparatus 10 comprises a pressure sensor 20 for sensing the pressure in the pipe. The pressure sensor is also connected to the pipe. Finally, apparatus 10 includes a mechanism 22 for determining whether the pressure of the fluid in the pipe has negatively deviated from that expected from the pressure-temperature relationship of the fluid.

Preferably, the producing mechanism 16 includes a mechanism 24 for determining the average time for pressure pulse reflection in the pipe. The determining mechanism 24 preferably is connected to the sensing mechanism 18.

Preferably, the sensing mechanism 18 includes a mechanism 26 for computing the average fluid propagation velocity using the average time of the pressure pulse reflection in communication with the determining mechanism 22. The sensing mechanism 18 preferably includes a mechanism 28 for computing the changes in average propagation velocity and average fluid temperature. This temperature change is preferably computed from the change in average propagation velocity and the change in fluid temperature capacity.

Preferably, the producing mechanism 16 includes a pressure transmitter mechanism 30 in connection with the pipe 14 for producing the pressure pulse. The producing mechanism 16 preferably includes an upstream pipeline valve 32 and a downstream pipeline valve 34, both of which isolate the pipeline. The pressure transmitter mechanism 30 is connected to the pipe 14 between the upstream pipeline valve 32 and the downstream pipeline valve 34. Preferably, the producing mechanism 16 includes a secondary pipe 36 connected to the pipe 14, a test apparatus root valve 38 connected to the secondary pipe 36 adjacent to the pipe 14, a pressure transmitter root valve 40 connected to the secondary pipe 36, and a pressure transmitter 42 pressure sensor 20 connected to the pressure transmitter root valve 40.

The present invention pertains to a method for detecting a fluid leak in an isolated segment of a pipe. The method consists of five steps: Step 1, measure propagation velocity in an isolated segment of the pipe at time $t_1$ by measuring pressure pulse transit time: Step 2, measure the pressure of the fluid in the isolated segment of the pipe at time $t_1$. Step 3, measure the pressure of the fluid in the isolated segment of the pipe at time $t_2$ and calculate the change in pressure occurring between $t_2$ and $t_1$. Step 4, using pressure pulses, measure the propagation velocity in the isolated segment of the pipe at time $t_2$ by measuring pressure pulse transit time, and determine the corresponding changes in propagation velocity and average temperature. Step 5, calculate the amount of pressure change due to temperature changes and the amount due to potential leak sources.

FIG. 4 also shows the apparatus 10 for determining leaks in a pipe 14. The apparatus includes a mechanism for detecting a leak in a pipe typically as low as 3 gph at 10 psi line pressure or lower. The apparatus also includes a mechanism for locating the leak.

Calculation of Pressure/Temperature Relationship to System Mass

In the operation of this apparatus, the mass of fluid in a isolated pipeline is given by:

$$M = V \cdot \rho$$

Where:
M=Mass in isolated pipeline
V=Volume in isolated pipeline
$\rho$=Fluid density A change in fluid mass, dM, due to leakage or makeup, must be accommodated by changes in volume or density:

$$dM = \rho \cdot dV + V \cdot d\rho$$

Assuming that a single phase of uniform fluid is present:

$$dM = \rho \cdot \left( \frac{\partial V}{\partial P} \bigg|_T dP + \frac{\partial V}{\partial T} \bigg|_P dT \right) + V \cdot \left( \frac{\partial \rho}{\partial P} \bigg|_T dP + \frac{\partial \rho}{\partial T} \bigg|_P dT \right) \quad (1)$$

Where:

$\dfrac{\partial V}{\partial P}\bigg|_P$ = partial derivative of volume with respect to temperature, $T$, at constant pressure $\dfrac{\partial V}{\partial P}\bigg|_P$ = partial derivative of volume with respect to pressure, $P$, at constant temperature $\dfrac{\partial \rho}{\partial T}\bigg|_P$ = partial derivative of fluid density with respect to temperature, $T$, at constant pressure $\dfrac{\partial \rho}{\partial P}\bigg|_T$ = partial derivative of fluid density with respect to pressure, $P$, at constant temperature For the case where the volume is that of a pipeline, the volume is given by $$V = A \cdot L$$

Where:
A=Cross sectional area of the pipe
L=Length of the pipe

If it is assumed that the length of the pipe is constrained (that is, changes in length caused by pressure stresses or thermal expansion are prevented by the pipe support system), then, for a pipe of circular cross section, $$dV = L dA = L d(\pi D^2/4) = L \pi D \, dD/2$$

Where:
D=Pipe diameter.

Pipe Volume Change Due to Pressure

The dependence of diameter on pressure is determined by the stress-strain relationship:

$$\sigma = E \, dD/D$$

Where:
$\sigma$=Stress in the pipe wall
E=Young's modulus

For a pipe of circular cross section subjected to internal pressure, the hoop stress is given by $$\sigma = PD/2t$$

Where
t=thickness of the pipe wall.

Hence, the change in diameter due to a change in pressure is given by $$dD = [D^2/(2tE)] dP$$

And the change in the volume of the pipe due to this change in pressure is $$dV = L[\pi D^3/4tE] dP$$

Pipe Volume Change Due to Temperature

The dependence of pipe 14 diameter on temperature is governed by the coefficient of thermal expansion.

$$D = D_0[1 + \alpha(T - T_0)]$$

Where $\alpha$ is the linear coefficient of expansion of the pipe wall material and the zero subscripts indicate the values for these variables at a selected reference condition.

$$dD = D_0 \alpha dT = D \alpha dT$$

Hence, the change in the volume of the pipe due to a change in temperature is $$dV = L \pi D^2 \alpha / 4 \, dT$$

Net Volume Change

Accordingly, the dependence of the volume of the pipe on temperature and pressure is given by:

$$dV = (L\pi D^2/4)\{(D/tE)\,dP + 2\alpha dT\}$$

Noting that $(L\pi D^2/4)$ is the volume V of the pipeline, a change in mass of the piping system is governed by the following relationship:

$$dM = \rho V\{D/(tE)dP + 2\alpha dT + (1/\rho)d\rho/dP|_T dP + d\rho/dT|_p dT]\}$$

$$dM = M\{[D/(tE) + (1/\rho)d\rho/dP|_T]dP + [2\alpha + (1/\rho)d\rho/dT|_p]dT\}$$

Using typical petroleum product properties and pipeline dimensions and treating pipeline total mass as a parameter, the above expression will be evaluated.

TYPICAL VALUES

D=0.75 ft=9 in t=0.25 in

D/t=36

E=27×10$^6$ psi; typical for carbon steel pipeline material $(1/\rho)\,d\rho/dP|_T$ defines the bulk modulus for the fluid; for a petroleum product, a typical bulk modulus, is 179,000 psi $\alpha = 6\times10^{-6}$ in/in per °F, typical for carbon steel material $(1/\rho)\,d\rho/dT|_p$ defines the thermal coefficient of expansion for the fluid, $\alpha_f$;

$\alpha_f = -6\times10^{-4}$ per °F; (the fluid becomes less dense as temperature increases).

$\rho = 52$ lbm/ft$^3$; typical for a refined petroleum product

Substituting these values in the expression for dM $$dM = M\{[36/27\times10^6 + 1/1.79\times10^5]dP + [2\times6\times10^{-6} - 6\times10^{-4}]dT\}$$

$$dM = M\{6.9\,e10^{-6}dP - 5.9\,e10^{-4}dT\}$$

Where the mass terms are expressed in pounds, the pressure term in psi, and the temperature term in degrees Fahrenheit.

Note, that for any pipeline total mass M or change in that mass dM, the change in temperature that will offset a 1 psi pressure change is $$dT = 6.9\,e10^{-6}/5.9\,e10^{-4} = 1.2\,e\,10^{-2}\ °F.$$

A change in mass equivalent to a 3 gallon leak is used to determine the pressure change produced by leaks:

$$dM = 3\text{ gallons} \times (1/7.48\text{ gallons per cubic foot}) \times 52\text{lbm/cubic foot} = 20.9\text{lbm}$$

The rate of pressure change dP/dt produced by the rate of mass change dM/dt is computed by dividing the dM equation by dt.

$$dM/dt = M\{6.9\times10^{-6}dP/dt\}$$

$$dP/dt = (20.9/6.9\times10^{-6})/M$$

$$dP/dt = (3\times10^6)/M$$

Figure 1:
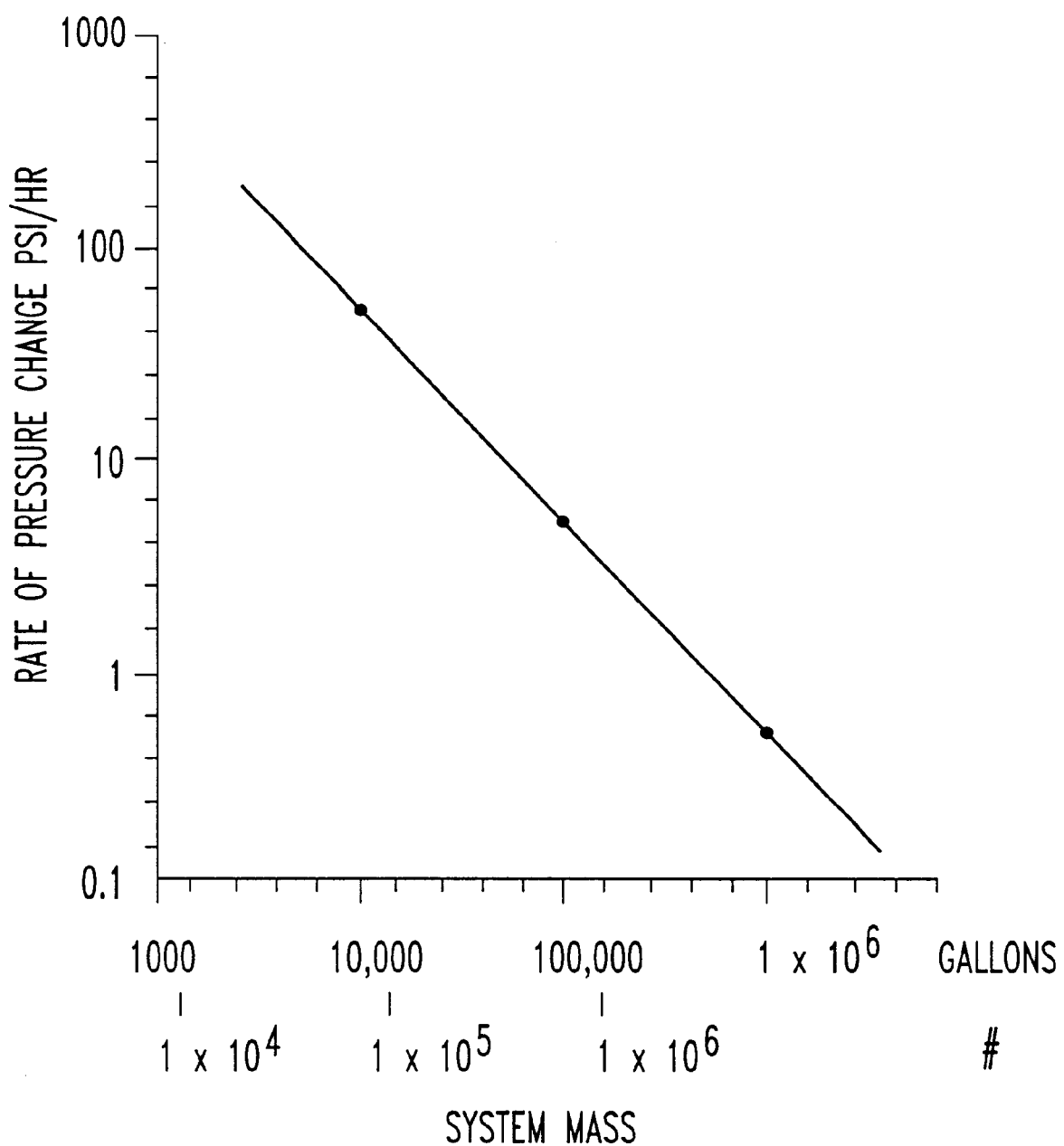
FIG. 1 is a graph of rate of pressure change in psi/hr for a 3-gph leak in piping systems as a function of mass and volume.

The dP/dt detection requirement is plotted against total pipeline system mass in FIG. 1. Mass is expressed both in pounds and in gallons (in the latter case assuming a 52 pounds per cubic foot density). To put the abscissa in context, a 5-mile-long, 9-inch (internal) diameter pipeline contains about 87,000 gallons or just over 600,000 pounds of the petroleum product used for this analysis.

Calculation of Propagation Velocity/Temperature Relationship

Unconstrained fluid propagation velocity, VP is related to fluid properties by the following state equation:

$$V_p^2 = \left.\frac{\partial P}{d\rho}\right|_{adiabatic} = \frac{K}{\rho} = \frac{\gamma F}{\rho}$$

Where:

$P$ = pressure $\rho$ = Density $K$ = Adiabatic Compressibility $\gamma$ = Conversion constant for Adiabatic Compressibility, $K$, to Isothermal Compressibility, $F$ Numerical values of thermal expansion, compressibility (iso-thermal), and density of hydrocarbons are documented in the API tables. In the above equation, note that this is an adiabatic relationship (no heat loss or gain). The adiabatic condition is justifiable for pressure waves given the short time duration.

In a pipe, the pipe strength and dimensions have an impact on the constrained fluid sound velocity by the following equation:

$$V_{pg} = \frac{\sqrt{\dfrac{1}{\rho}}}{\sqrt{\left(\dfrac{1}{K} + \dfrac{OD}{a_p \cdot E_p}\right)}}$$

Where:

$V_{pg}$ = Constrained fluid propagation velocity for pressure pulses constrained to travel down a pipeline $OD$ = Outside diameter of the pipe $a_p$ = Wall thickness of the pipe $E_p$ = Young's Modulus of the pipe With respect to temperature effects, this propagation velocity, Vpg, is still completely dominated by the fluid properties.

By using the temperature-to-propagation velocity relationship, a measurement of the average sound velocity of an isolated pipe 12 gives a direct indication of the average temperature of the fluid in the pipe. Calculations from the API tables and direct measurements put the propagation velocity/temperature relationship in the range of −84 in./sec/°F. to −97 in/sec/°F. (on average equal to −90 in/sec/°F.+/−10%) for typical hydrocarbons (diesel, gasoline, and kerosene). The room temperature free propagation velocity of typical hydrocarbons is approximately 50,000 in/sec.

Using these values provides the following relationship:

$$\frac{1}{V_p} \cdot \left(\frac{V_p}{dT}\right) = \frac{-90\text{ in/sec}/°F.}{50,000\text{ in/sec}} = -0.18\%/°F.$$

Hence, a propagation velocity measurement for a leak measuring system that is required to assess leakage based on a 1 psi pressure change, must have a precision of at least:

$$(1\times10^{-2}°F.)\times(90\text{ in/sec}/°F.)/(50,000\text{ in/sec}) = 2.5\times10^{-5}\text{ per unit} = 0.0025\%$$

The pressure pulse transit time is measured and the average propagation velocity is calculated using the pipeline length.

$$V_{pg} = \frac{L_{pipeline}}{t_{transit}}$$

Where:

$t_{transit}$ = time required for pressure pulse to travel the length of the pipeline In practice, is it more practical to measure the round trip transit time or a multiple of round trips (since the pressure pulse continues to echo back and forth through the pipeline and decays slowly.) For a 1-mile pipeline the round trip transit time will be in the order of 3 seconds; for a 10-mile pipeline, in the order of 30 seconds. Tests have shown that the precision of the transit time measurement is better than 1 millisecond. Hence, a single measurement of transit time will likely be accurate to about 1 part in 1000 for the 1-mile line and about 1 part in 10,000 for the 10-mile line. Several repetitions of the transit time measurements may be used to achieve the better precision. (Most of the uncertainties in the transit time measurement are random; hence repeated measurements of the transit time will reduce the uncertainty in this variable when it is determined from the average of the measurements.)

Description of System

The apparatus 10 described herein detects leaks by measuring the drop in pressure caused by a leak (if there is one) over a preselected time period, determining the change in temperature over the preselected period, and compensating for any temperature change effects. As is discussed in the following sections, the magnitude of the pressure change brought about by a leak will depend on the selected time period and the total mass in the system. If, at the same time the leak test is being performed, the temperature of the fluid is changing, the apparatus will determine the change in fluid temperature over the period of the test. The precision with which the change in temperature is determined will be an order of magnitude better than that corresponding to the pressure change. For example, if a 1-psi change over 20 minutes is indicative of the specified leak rate, the temperature change in 20 minutes must be measured at least as well as the figure computed above, or about 0.01 °F., and preferably better.

The apparatus 10 described herein determines the change in fluid temperature by measuring the change in the fluid propagation velocity of the fluid over the time period for the test. (The means by which this measurement is accomplished are described later.)

FIG. 2 is a schematic diagram of the fluid system apparatus 10 that could be employed to conduct leak tests using the principles described above. A key to the symbols used in given on the figure is as follows.

$V_{PLU}$=Pipeline valve, upstream, item 32
$V_{PLD}$=Pipeline valve, downstream, item 34
$V_R$=Test apparatus root valve, item 38
$V_{PR}$=Pressure sensor root valve, item 40
$V_{PV}$=Pump vent The procedure to be employed in using the apparatus 10 to determine the leak rate of a pipeline system is outlined in the paragraphs that follow. The procedure can be fully or partially automated.

1. The pipeline system to be tested is shut down and the pipeline 12 is isolated by closing valves 32 and 34. It should be noted that the procedure outlined will measure leakage not only from the pipeline connecting 32 and 34, but also leakage past the valves themselves.
2. The test apparatus 10 is connected preferably near one end of the isolated pipeline 12. Initially, the test apparatus 10 is isolated from the fluid system to be tested by valves V2 and V3, which are closed. Root valve, VR, and the isolation valve, VPR, for pressure sensor, PT, may be opened. It is assumed that the line is pressurized. If the pipe 12 is not pressurized the apparatus shown in FIG. 2 can be used to pressurize by someone skilled in the art.
3. The initial propagation velocity, at time ti, is measured by inducing a pressure pulse and measuring its round-trip transit time in the isolated pipeline. One approach is to use a fast acting valve to release fluid into a container. Each such test is performed by opening a solenoid valve V2 and thereby allowing a small amount of product to flow from the isolated pipeline 12 into a container, VOL. During this transient, V1 is open and V3 is closed. The transient is terminated by rapidly closing V2. The negative step pressure wave produced by this transient is sensed by transmitter PT at its inception and again after its round trip transit of the pipeline. The pressure transients are recorded by a high-speed data acquisition system and the time difference between them is determined using suitable signal processing. The transit time data are recorded. Repeated tests are performed if necessary to achieve desired precision. Likewise, repeated echoes can be measured to improve accuracy.
4. Immediately after the pipeline 12 propagation velocity measurement, the pressure is monitored from time $t_1$ to time $t_2$. Changes in pressure are detected over this time period.
5. At time $t_2$, the propagation velocity is re-measured as described in step 3. Again the number of transit time measurements may be made to comply with temperature measurement precision requirements. Using these data, the test results obtained in step 4 are then compensated for product temperature change, using the relationships developed in the preceding section.

Although the invention has been described in detail in the foregoing for the purpose of illustration, it is to be understood that such detail is solely for that purpose and that variations can be made therein by those skilled in the art without departing from the spirit and scope of the invention except as it may be described by the following claims.

What is claimed is:

1. An apparatus for detecting a leak in an isolated segment of a pipe with a known fluid comprising:

a mechanism for producing a pulse in the fluid in the pipe, said producing mechanism adapted to be connected to the pipe;

a mechanism for sensing the presence of the pulse in the fluid in the pipe;

a mechanism for determining transit time of the pulse at least at one location along the pipe, the determining mechanism in communication with the sensing mechanism, a pressure sensor for sensing the pressure in the pipe, said pressure sensor adapted to connected to the pipe; and a mechanism for determining whether the pressure of the fluid in the pipe has negatively deviated from an expected pressure-temperature relationship of the fluid in the pipe based on the pressure in the pipe sensed by the pressure sensor and the transit time of the pulse in the fluid in the pipe, said determining mechanism in communication with the pressure sensor and the sensing mechanism.

2. An apparatus as described in claim 1 wherein the producing mechanism produces a pressure pulse and the sensor mechanism senses the presence of the pressure pulse in the fluid in the pipe at locations along the pipe including terminal ends of the segment.

3. An apparatus as described in claim 2 wherein the determining mechanism includes a mechanism for determining the average time for pressure pulse travel in the fluid in the pipe, said determining mechanism connected to the sensing mechanism, the determining mechanism determining negative deviation based also on the average time for pressure pulse travel in the fluid in the pipe.

4. An apparatus as described in claim 3 wherein the sensing mechanism includes a mechanism for computing the propagation velocity in the pipe from the average time for pressure pulse reflection in communication with the determining mechanism.

5. An apparatus as described in claim 4 wherein the sensing mechanism includes a mechanism for computing the change in fluid temperature from the changes in the propagation velocity, the mechanism for computing the propagation in communication with the mechanism for computing the change in fluid temperature.

6. An apparatus as described in claim 5 wherein the producing mechanism includes a pressure transmitter mechanism in connection with the pipe for producing the pressure pulse.

7. An apparatus as described in claim 6 wherein the producing mechanism includes an upstream pipeline valve and a downstream pipeline valve both of which seal the pipeline, said pressure transmitter mechanism connected to the pipe between the upstream pipeline valve and the downstream pipeline valve.

8. An apparatus as described in claim 7 wherein the producing mechanism includes a secondary pipe connected to the pipe, a test apparatus root valve connected to the secondary pipe adjacent to the pipe; a pressure transmitter root valve connected to the secondary pipe and a pressure transmitter connected to the pressure transmitter root valve.

9. A method for detecting a leak in an isolated segment of a pipe with a fluid comprising the steps of:

measuring propagation velocity in an isolated segment of the pipe at time $t_1$ with a mechanism for computing the propagation velocity;

measuring pressure of the fluid in the isolated segment of the pipe at time $t_1$ with a pressure sensor;

measuring pressure of the fluid in the isolated segment of the pipe at time $t_2$ with a pressure sensor;

measuring propagation velocity in an isolated segment of the pipe at time $t_1$ with the mechanism for computing the propagation velocity; and determining if there is a negative deviation of pressure from an expected propagation velocity-temperature relationship of the fluid in the isolated segment of the pipe with a mechanism for determining whether the pressure of the fluid in the pipe has negatively deviated from an expected pressure-temperature relationship of the fluid in the pipe.

\* \* \* \* \*